United States Patent
Cheng et al.

(10) Patent No.: US 11,404,978 B2
(45) Date of Patent: Aug. 2, 2022

(54) BRAKING CIRCUIT AND PAPER LIFTING DEVICE

(71) Applicant: Avision Inc., Hsinchu (TW)

(72) Inventors: Wei-Chin Cheng, Zhubei (TW); Liu-Liang Lin, Zhubei (TW)

(73) Assignee: AVISION INC., Hsinchu (TW)

( * ) Notice: Subject to any disclaimer, the term of this patent is extended or adjusted under 35 U.S.C. 154(b) by 489 days.

(21) Appl. No.: 16/390,377

(22) Filed: Apr. 22, 2019

(65) Prior Publication Data
US 2019/0386589 A1   Dec. 19, 2019

(30) Foreign Application Priority Data

Jun. 15, 2018 (TW) .................................. 107120782

(51) Int. Cl.
*H02P 3/12* (2006.01)
*B65H 1/18* (2006.01)

(52) U.S. Cl.
CPC .................. *H02P 3/12* (2013.01); *B65H 1/18* (2013.01)

(58) Field of Classification Search
CPC ..................................... B65H 1/18; H02P 3/12
See application file for complete search history.

(56) References Cited

U.S. PATENT DOCUMENTS 3,301,126 A * 1/1967 Osborne et al. ....... G03G 15/30
399/16
3,558,127 A * 1/1971 Blewitt, Jr. ......... G03G 15/6502
271/155

2016/0329814 A1 * 11/2016 Fahlenkamp ..... H02M 3/33523
2016/0355355 A1 * 12/2016 Hirajima ................. B65H 7/14
2017/0154591 A1 * 6/2017 Hung ..................... G09G 3/3677

FOREIGN PATENT DOCUMENTS

CN         207368912 U        5/2018

OTHER PUBLICATIONS

Machine translation of Chinese Publication No. CN207368912. (Year: 2018).*
Office Action issued by (TIPO) Intellectual Property Office, Ministry of Economic Affairs, R.O.C. dated Nov. 4, 2019 for Application No. 107120782, Taiwan.

* cited by examiner

*Primary Examiner* — Thomas A Morrison
(74) *Attorney, Agent, or Firm* — Locke Lord LLP; Tim Tingkang Xia, Esq.

(57) ABSTRACT

A breaking circuit applied to a motor comprises an actuator, an anti-reverse component and a limiting resistor. The actuator comprises a first electricity transmission terminal, a second electricity transmission terminal and a controlled terminal, with the controlled terminal configured to be connected with a power supply port, and the first electricity transmission terminal configured to be electrically connected with a power input terminal of the motor. The anti-reverse component is electrically connected between the controlled terminal and the first electricity transmission terminal of the actuator. The limiting resistor is electrically and serially connected with the first electricity transmission terminal or the second electricity transmission terminal of the actuator. When power supplied from the power supply port to the power input terminal is stopped, the actuator is conducted to form a discharge path from the power input terminal through the limiting resistor to a low electric potential end.

10 Claims, 6 Drawing Sheets

BRAKING CIRCUIT AND PAPER LIFTING DEVICE

This non-provisional application claims priority under 35 U.S.C. § 119(a) on Patent Application No(s). 107120782 filed in Taiwan, R.O.C. on Jun. 15, 2018 the entire contents of which are hereby incorporated by reference.

BACKGROUND

Technical Field

This disclosure relates to a breaking circuit, and particularly to a breaking circuit applied to a motor.

Related Art

In the modern society, a business machine plays an indispensable role in recording and transmission of information. The business machine has the functions of printing, photocopying, faxing, etc. For good execution quality of these functions, it is important to establish a fast and stable paper feeding process.

In general, the paper feeding process is performed by a paper lifting device in the business machine, and includes lifting a paper lifting tray up by a direct-current motor and a reduction gear and stops supplying the power to the direct-current motor when determining the lifting height of the paper lifting tray matches the expectation. However, after the power is cut off, the motor continues rotating for a while due to inertia, and the paper lifting tray continues being lifted up. As a result, the interference between the paper lifting tray and other mechanisms in the business machine must happen and cause damages to these mechanisms or a situation of paper jam.

SUMMARY

This disclosure provides a breaking circuit and a paper lifting device.

According an embodiment of this disclosure, a breaking circuit applied to a motor comprises an actuator, an anti-reverse component and a limiting resistor. The actuator comprises a first electricity transmission terminal, a second electricity transmission terminal and a controlled terminal, with the controlled terminal configured to be connected with a power supply port, and the first electricity transmission terminal configured to be electrically connected with a power input terminal of the motor. The anti-reverse component is electrically connected between the controlled terminal and the first electricity transmission terminal of the actuator. The limiting resistor is electrically and serially connected with the first electricity transmission terminal or the second electricity transmission terminal of the actuator. When power supplied from the power supply port to the power input terminal is stopped, the actuator is conducted to form a discharge path from the power input terminal through the limiting resistor to a low electric potential end.

According to one or more embodiment of this disclosure, a paper lifting device comprises a body and a breaking circuit. The body comprises a paper lifting tray, a gear linking rod group, a motor, a paper lifting height sensor and a power supply port, wherein the gear linking rod group is connected between the paper lifting tray and the motor, and the power supply port is electrically connected between the motor and the paper lifting height sensor. The gear linking rod group is rotated by the motor to bring the paper lifting tray to rotate when the power supply port supplies power to the motor, and the power supply port stops supplying the power when the paper lifting height sensor determines that a lifting height of the paper lifting tray matches a predetermined height predetermined height. The breaking circuit is applied to a motor and comprises an actuator, an anti-reverse component and a limiting resistor. The actuator comprises a controlled terminal, a first electricity transmission terminal and a second electricity transmission terminal, with the controlled terminal configured to be connected with the power supply port, and the first electricity transmission terminal electrically connected with a power input terminal of the motor. The anti-reverse component is electrically connected between the controlled terminal and the first electricity transmission terminal of the actuator. The limiting resistor is electrically and serially connected with the first electricity transmission terminal or the second electricity transmission terminal of the actuator. When the power supply port stops supplying the power, the actuator is conducted to form a discharge path from the power input terminal through the limiting resistor to a low electric potential end.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
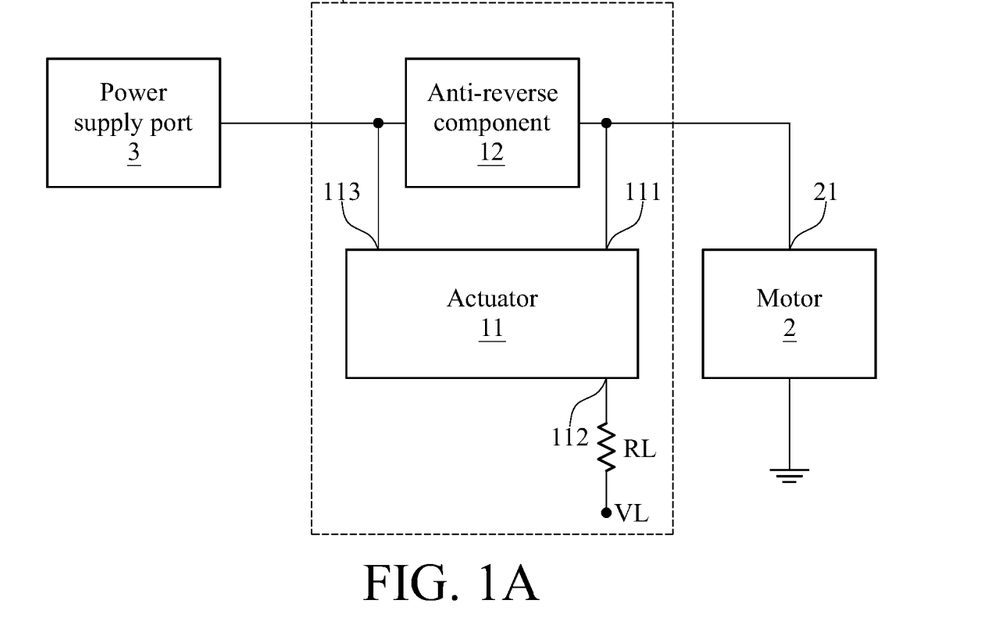
FIG. 1A is a schematic diagram of a breaking circuit according to an embodiment of this disclosure.

Please refer to FIG. 1A which is a schematic diagram of a breaking circuit according to an embodiment of this disclosure. As shown in FIG. 1A, a breaking circuit 1 is applied to a motor 2, and configured to be electrically connected between the motor 2 and a power supply port 3 to perform breaking operation of the motor 2, wherein the details of the breaking operation are described later. For example, the motor 2 applicable to the breaking circuit 1 can be the motor of a paper lifting device in a business machine (e.g. printer, photocopier, telefax, etc.), and the power supply port 3 can be the power switch of the motor 2 for being connected to an external power supply, which is not limited in this disclosure.

The breaking circuit 1 comprises an actuator 11, an anti-reverse component 12 and a limiting resistor RL. The actuator 11 comprises a first electricity transmission terminal 111, a second electricity transmission terminal 112 and a controlled terminal 113, with the controlled terminal 113 configured to be connected with the power supply port 3, and the first electricity transmission terminal 111 configured to be electrically connected with a power input terminal 21 of the motor 2. The anti-reverse component 12 is electrically connected between the controlled terminal 113 and the first electricity transmission terminal 111 of the actuator 11. More specifically, the anti-reverse component 12 is a diode for example, wherein its anode terminal is electrically connected with the controlled terminal 113 of the actuator 11, and its cathode terminal is electrically connected with the first electricity transmission terminal 111 of the actuator 11, for obstructing the current from the cathode terminal to the anode terminal. The limiting resistor RL is electrically and serially connected with the first electricity transmission terminal 111 or the second electricity transmission terminal 112 of the actuator 11. FIG. 1A and the later FIG. 1B exemplarily illustrate that the limiting resistor RL is serially connected with the second electricity transmission terminal 112 of the actuator 11, but in another embodiment, the limiting resistor RL can be serially connected with the first electricity transmission terminal 111 of the actuator 11; the details of its implementation circuit are described later.

Figure 1B:
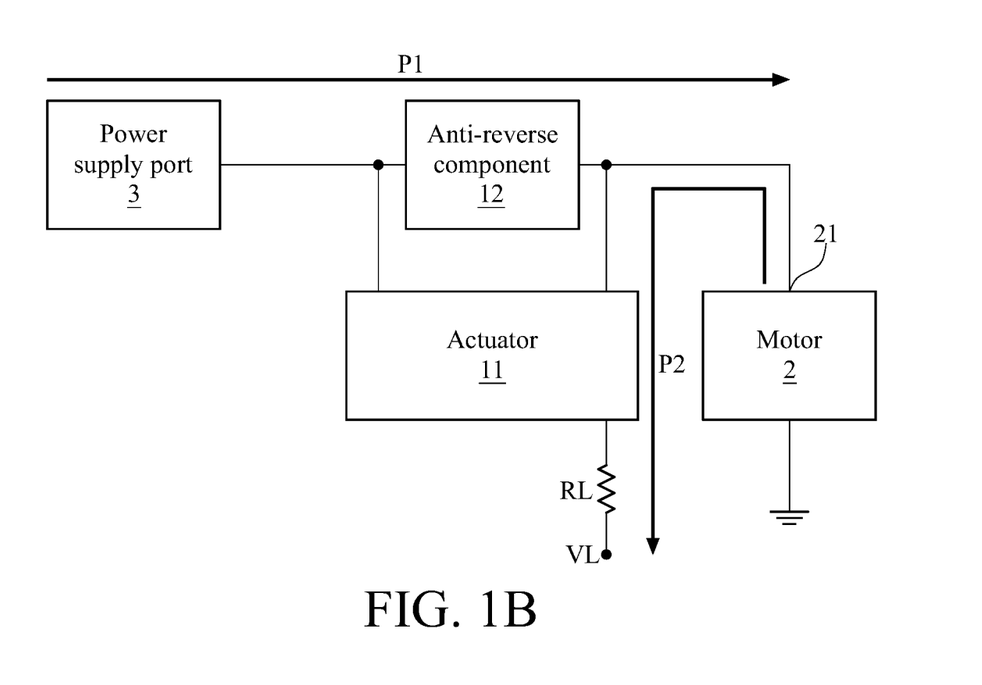
FIG. 1B is a schematic diagram of a current path of a breaking circuit according to an embodiment of this disclosure.

Please refer to FIG. 1B, which is a schematic diagram of a current path of a breaking circuit according to an embodiment of this disclosure. As shown in FIG. 1B, when the power supply port 3 supplies power to the motor 2, a current flows through the anti-reverse component 12 to the power input terminal of the motor 2 along a power supplying path P1, to drive the motor 2 to rotate; and when the power supplied from the power supply port 3 to the power input terminal 21 of the motor 2 is stopped, the actuator 11 is conducted to form a discharge path P2 from the power input terminal 21 of the motor 2 through the limiting resistor RL to the low electric potential end VL. More specifically, when the power supply port 3 is switched from the power-on mode to the power-off mode, the motor 2 continues rotating due to inertia, so as to generate an induced electromotive force. At this moment, the breaking circuit 1 provides the discharge path P2 which is formed by the partial circuit of the actuator 11 and the limiting resistor RL for transmitting the induced electromotive force generated by the motor 2 to the low electric potential end VL, so that the motor 2 is quickly stopped rotating. For example, the low electric potential end VL is a ground end or another defined end having a low electric potential. In other words, when the power supply is switched from the power-on mode to the power-off mode, the rotor of the motor 2 is stopped not only by mechanical energy consumption but also by quick consumption of the induced electromotive force for quickly reducing the inertia force of the rotor, so that precise control of the stopping position of the rotor may be achieved.

Figure 2A:
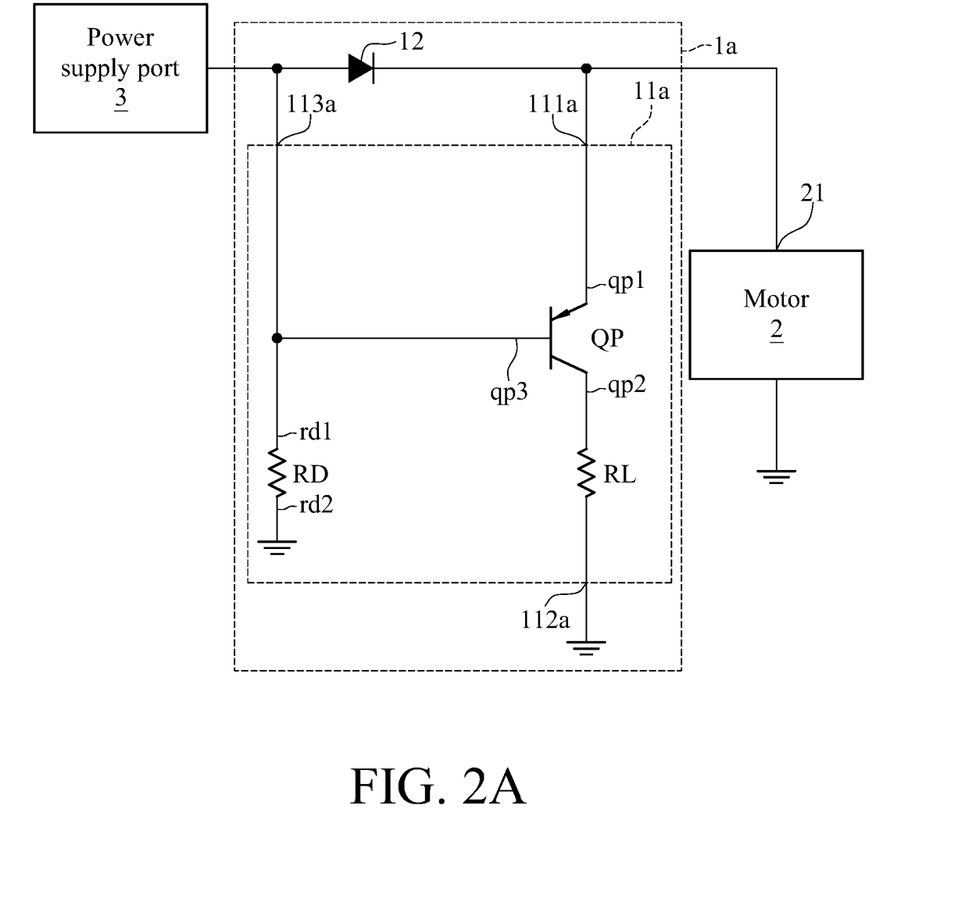
FIG. 2A is a detailed schematic diagram of a breaking circuit according to an embodiment of this disclosure.
Figure 2B:
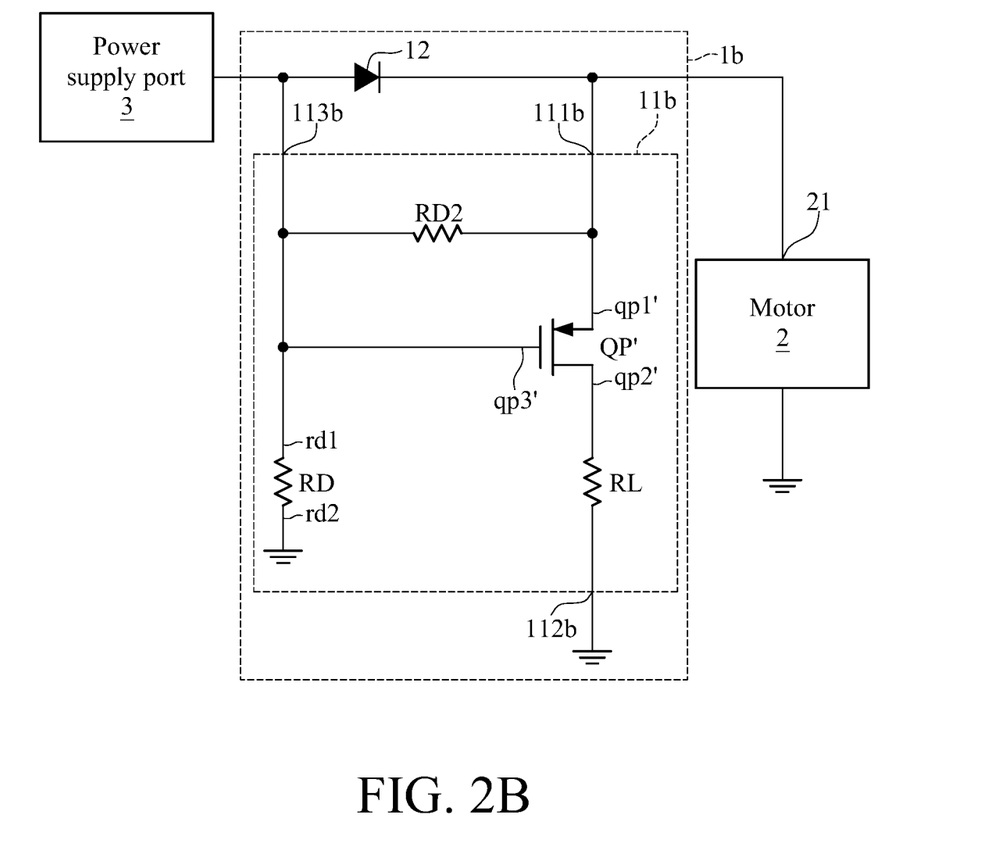
FIG. 2B is a detailed schematic diagram of a breaking circuit according to another embodiment of this disclosure.
Figure 2C:
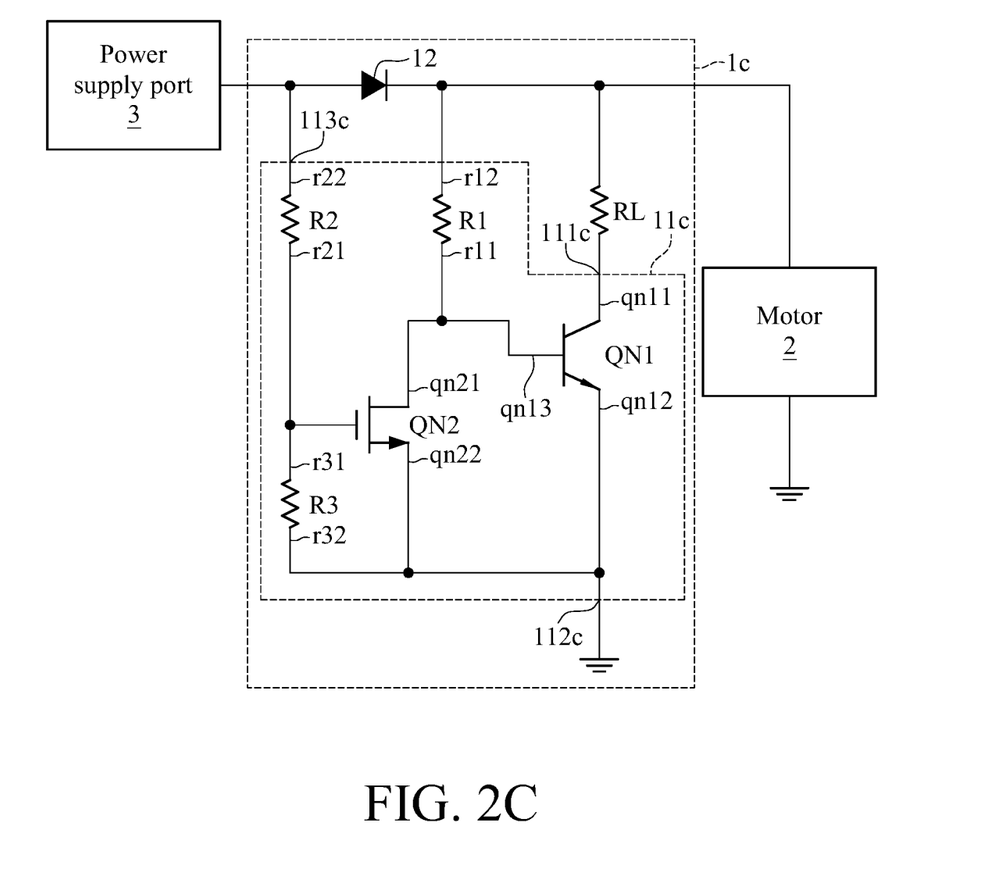
FIG. 2C is a detailed schematic diagram of a breaking circuit according to yet another embodiment of this disclosure.
Figure 2D:
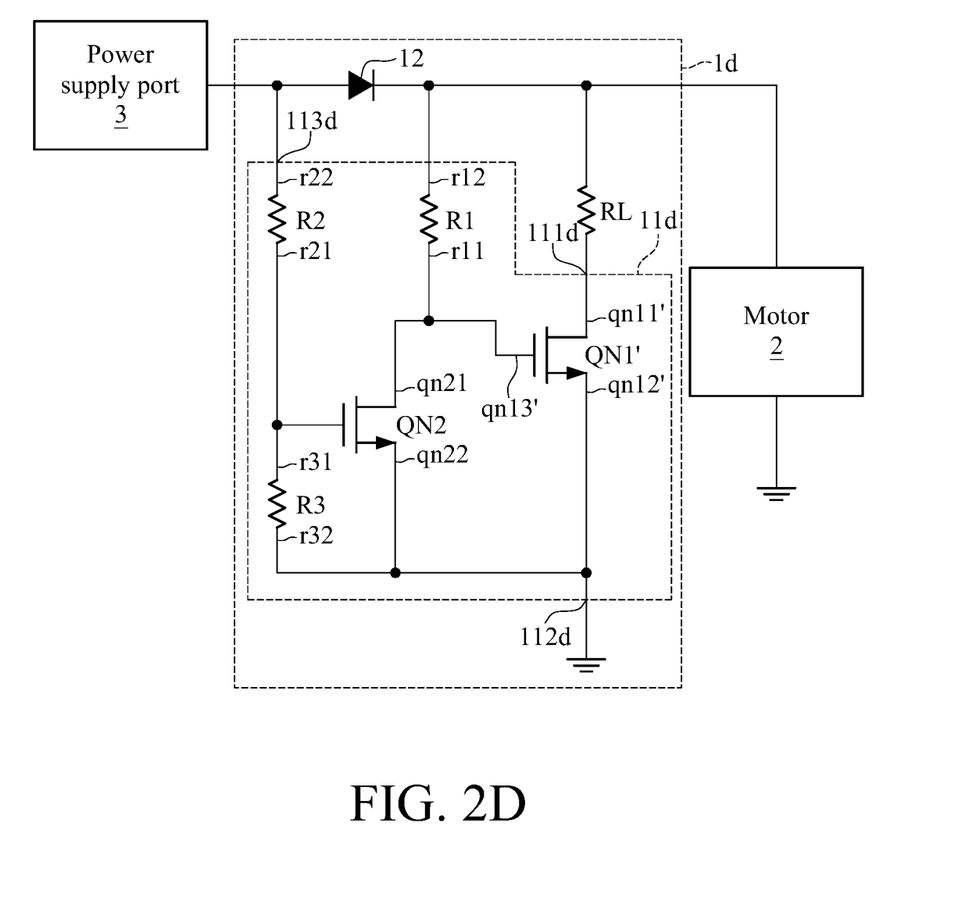
FIG. 2D is a detailed schematic diagram of a breaking circuit according to yet another embodiment of this disclosure.

For the particularly description of the detailed circuit of the actuator 11 in the breaking circuit 1, please refer to FIGS. 2A-2D, wherein FIG. 2A is a detailed schematic diagram of a breaking circuit according to an embodiment of this disclosure; FIG. 2B is a detailed schematic diagram of a breaking circuit according to another embodiment of this disclosure; FIG. 2C is a detailed schematic diagram of a breaking circuit according to yet another embodiment of this disclosure; and FIG. 2D is a detailed schematic diagram of a breaking circuit according to yet another embodiment of this disclosure. In the embodiments as shown in FIGS. 2A and 2B, the aforementioned discharge path P2 is formed at least by a P-type transistor and a limiting resistor RL; and in the embodiments as shown in FIGS. 2C and 2D, the discharge path P2 is formed at least by a limiting resistor RL and a N-type transistor.

More specifically, in the embodiment as shown in FIG. 2A, an actuator 11a of a breaking circuit 1a comprises a P-type transistor QP and a divider resistor RD. The P-type transistor QP comprises an electricity input terminal qp1, an electricity output terminal qp2 and a sub controlled terminal qp3, wherein the electricity input terminal qp1 serves as the first electricity transmission terminal 111a of the actuator 11a, the electricity output terminal qp2 serves as the second electricity transmission terminal 112a of the actuator 11a, and the sub controlled terminal qp3 is electrically connected with the first terminal rd1 of the divider resistor RD to jointly form the controlled terminal 113a of the actuator 11a. The second terminal rd2 of the divider resistor RD is connected to the low electric potential end VL, such as the ground end or another defined low electric potential end, which is not limited in this disclosure. The limiting resistor RL is electrically connected between the electricity output terminal qp2 of the P-type transistor QP (i.e. the second electricity transmission terminal 112a of the actuator 11a) and the ground end (i.e. low electric potential end VL).

The following description is to explain the operation of the breaking circuit 1a in details. When the power supply port 3 supplies the power to the motor 2, a current flows from the power supply port 3 through the anti-reverse component 12 to the power input terminal 21 of the motor 2, and also flows through the divider resistor RD, so that the P-type transistor QP is not conducted because the sub controlled terminal qp3 has a high electric potential; that is, the actuator 11a is not conducted when the power supply port 3 supplies the power to the motor 2. In contrast, when the power supplied from the power supply port 3 to the power input terminal 21 of the motor 2 is stopped, the motor 2 rotates due to inertia so as to generate an induced electromotive force transmitted from the power input terminal 21 to the breaking circuit 1a. At this moment, the anti-reverse component 12 prevents the induced electromotive force from flowing reversely to the controlled terminal 113a of the actuator 11a, so that the P-type transistor QP is conducted because its sub controlled terminal qp3 has a low electric potential. The induced electromotive force passes through the power input terminal 21, the P-type transistor QP, the limiting resistor RL and the ground end in sequence. In other words, the actuator 11a is conducted when the power supply port 3 stopped supplying the power to the motor 2, and the discharge path P2 is formed by the P-type transistor QP of the actuator 11a and the limiting resistor RL.

In this embodiment, the P-type transistor QP comprises a bipolar junction transistor (BJT). The electricity input terminal qp1 of the P-type transistor QP is the emitter of the BJT, the electricity output terminal qp2 is the collector of the BJT, and the sub controlled terminal qp3 is the base of the BJT.

In another embodiment, as shown in FIG. 2B, a actuator 11b of a breaking circuit 1b, similar to that of the breaking circuit 1a in the aforementioned FIG. 2A, comprises a P-type transistor QP' and a divider resistor RD, wherein the connection therebetween and the current paths therein are similar to those in the embodiment of FIG. 2A, so they are not repeated herein. In the embodiment as shown in FIG. 2B, the P-type transistor QP' comprises a metal-oxide-semiconductor field-effect transistor (MOSFET). The electricity input terminal qp1' of the P-type transistor QP' is the source of the MOSFET, the electricity output terminal qp2' is the drain of the MOSFET, and the sub controlled terminal qp3' is the gate of the MOSFET. More particularly, in this embodiment, the actuator 11b can further comprises another divider resistor RD2 electrically connected between the electricity input terminal qp1' and the sub controlled terminal qp3' of the P-type transistor QP', for allowing the MOSFET which serves as the P-type transistor QP' to work in the rated voltage range.

In yet another embodiment, as shown in FIG. 2C, the actuator 11c of the breaking circuit 1c comprises a first N-type transistor QN1, a second N-type transistor QN2, a first divider resistor R1, a second divider resistor R2 and a third divider resistor R3. The first N-type transistor QN1 comprises an electricity input terminal qn11, an electricity output terminal qn12 and a sub controlled terminal qn13. The second N-type transistor QN2 also comprises an electricity input terminal qn21, an electricity output terminal qn22 and a sub controlled terminal qn23. The sub controlled terminal (pH of the first N-type transistor QN1 is electrically connected with the electricity input terminal qn21 of the second N-type transistor QN2 and the first terminal r11 of the first divider resistor R1. The sub controlled terminal qn23 of the second N-type transistor QN2 is electrically connected with the first terminal r21 of the second divider resistor R2 and the first terminal r31 of the third divider resistor R3. The second terminal r22 of the second divider resistor R2 serves as the controlled terminal 113c of the actuator 11c. The electricity input terminal qn11 of the first N-type transistor QN1 serves as the first electricity transmission terminal 111c of the actuator 11c, and is electrically connected with the limiting resistor RL. The electricity output terminal qn12 of the first N-type transistor QN1, the electricity output terminal qn22 of the second N-type transistor QN2 and the second terminal r32 of the third divider resistor R3 jointly serve as the second electricity transmission terminal 112c of the actuator 11c, and are connected to the low electric potential end. In FIG. 2C, the ground end is illustrated as the low electric potential end. In this embodiment, the second terminal r12 of the first divider resistor R1 is configured to be electrically connected with the power input terminal 21 of the motor 2. In another embodiment, the second terminal r12 of the first divider resistor R1 can be connected with another power supply port.

The following description is to explain the operation of the breaking circuit 1c in details. When the power supply port 3 supplies the power to the motor 2, a current flows from the power supply port 3 through the anti-reverse component 12 to the power input terminal 21 of the motor 2, and also flows through the second divider resistor RD2 and the third divider resistor RD3, so that the second N-type transistor QN2 is conducted because the sub controlled terminal qn23 has a high electric potential. At this moment, the sub controlled terminal qn13 of the first N-type transistor QN1 has a low electric potential because the second N-type transistor QN2 is conducted, so that the first N-type transistor QN1 is not conducted; that is, the actuator 11c is not conducted when the power supply port 3 supplies the power to the motor 2. In contrast, when the power supplied from the power supply port 3 to the power input terminal 21 of the motor 2 is stopped, the induced electromotive force which is generated from the inertial rotation of the motor 2 is transmitted from the power input terminal 21 to the breaking circuit 1c. At this moment, the anti-reverse component 12 prevents the induced electromotive force from flowing reversely to the controlled terminal 113c of the actuator 11c, so that the second N-type transistor QN2 is not conducted because its sub controlled terminal qn23 has a low electric potential. At the same time, the sub controlled terminal qn13 of the first N-type transistor QN1 has a high electric potential because the second N-type transistor QN2 is not conducted, so that the first N-type transistor QN1 is conducted, and the induced electromotive force passes through the power input terminal 21, the limiting resistor RL, the first N-type transistor QN1 and the ground end in sequence. In other words, the actuator 11c is conducted when the power supply port 3 stops supplying the power to the motor 2, and the discharge path P2 is formed by the limiting resistor RL and the first N-type transistor QN1 of the actuator 11c.

In this embodiment, the first N-type transistor QN1 comprises a BJT, and the second N-type transistor QN2 comprises a MOSFET. The electricity input terminal qn11 of the first N-type transistor QN1 is the collector of the BJT, the electricity output terminal qn12 is the emitter of the BJT, and the sub controlled terminal qn13 is the base of the BJT. The electricity input terminal qn21 of the second N-type transistor QN2 is the drain of the MOSFET, the electricity output terminal qn22 is the source of the MOSFET, and the sub controlled terminal qn23 is the gate of the MOSFET.

In yet another embodiment, as shown in FIG. 2D, each of the first N-type transistor QN1 and the second N-type transistor QN2 comprises a MOSFET. In the embodiment as shown in FIG. 2D, the actuator 11d of the breaking circuit 1d, similar to that of the breaking circuit 1c in the aforementioned FIG. 2C, comprises a first N-type transistor QN1', a second N-type transistor QN2, a first divider resistor R1, a second divider resistor R2 and a third divider resistor R3, wherein the connections therebetween and the current paths therein are similar to those in the embodiment of FIG. 2D, so they are not repeated herein. In yet another embodiment, the first N-type transistor QN1 and the second N-type transistor QN2 are implemented by BJTs, or the first N-type transistor QN1 is implemented by a MOSFET and the second N-type transistor QN2 is implemented by a BJT, which are not limited in this disclosure.

Figure 3:
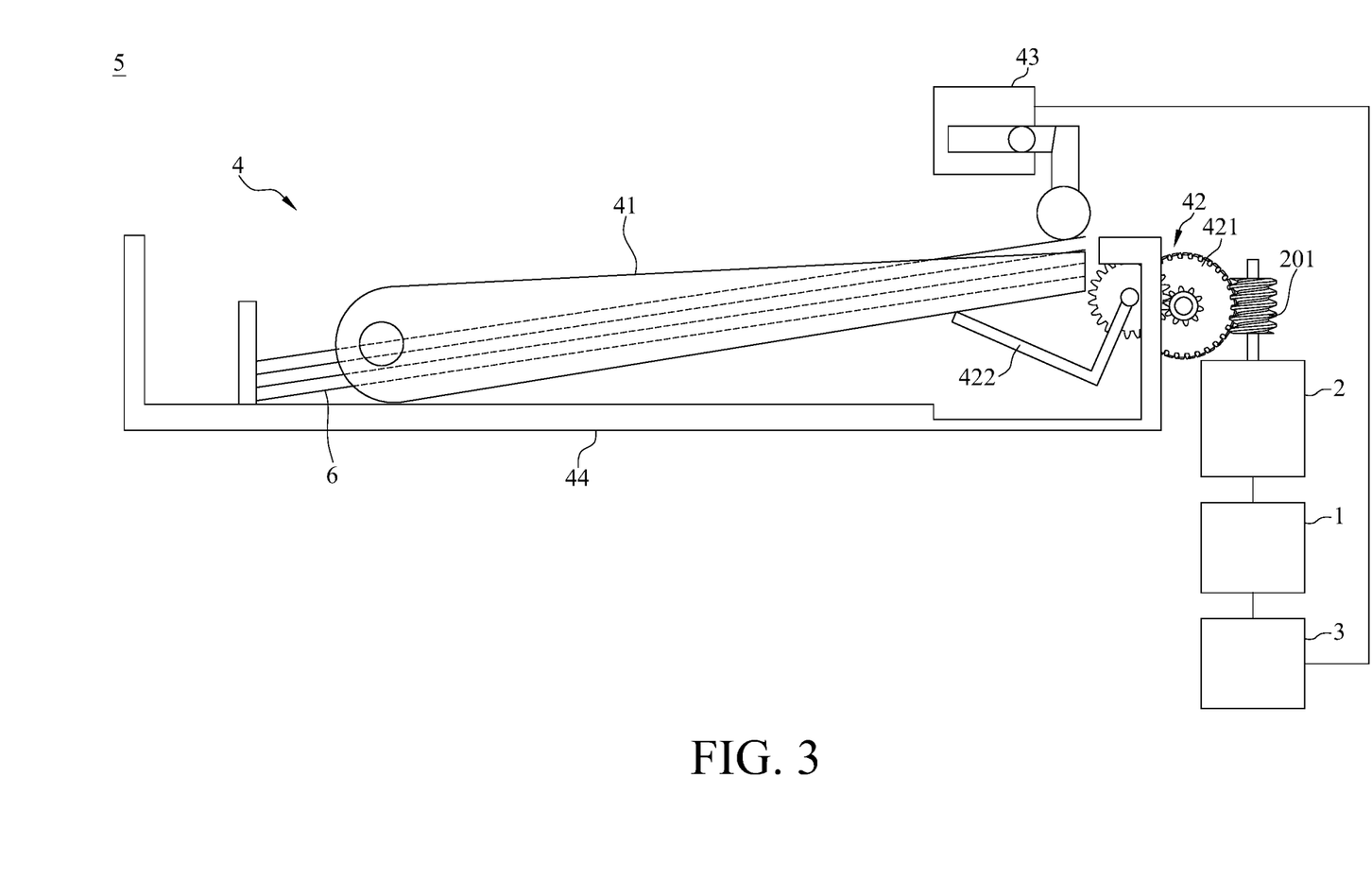
FIG. 3 is a schematic diagram of a paper lifting device according to an embodiment of this disclosure.

The breaking circuits 1a-1d in the above embodiments are applied to perform breaking operation of the motor 2, and particularly of a motor of a paper lifting device in a business machine, such as printer, photocopier, telefax, etc. Please refer to FIGS. 1A, 1B, 2A-2D and 3, wherein FIG. 3 is a schematic diagram of a paper lifting device 5 according to an embodiment of this disclosure. The paper lifting device 5 comprises one of the breaking circuits 1a-1d in the above embodiments which is represented by the breaking circuit 1. The paper lifting device 5 comprises a body 4 and the breaking circuit 1. The body 4 comprises a paper lifting tray 41, a gear linking rod group 42, a motor 2, a paper lifting height sensor 43 and a power supply port 3, wherein the paper lifting tray 41 is rotatably disposed in a paper cassette 44 which is configured to accommodate paper 6; the gear linking rod group 42 is connected between the paper lifting tray 41 and the motor 2; the power supply port 3 is a power switch of a business machine for example, and electrically connected with the motor 2 and the paper lifting height sensor 43. When the power supply port 3 supplies power to the motor 2, the gear linking rod group 42 is rotated by the motor 2, so as to bring the paper lifting tray 41 to rotate and to lift the paper 6 in the paper cassette 44 up. Then, when the paper lifting height sensor 43 determines that the lifting height of the paper lifting tray 41 matches a predetermined height, the power supplied from the power supply port 3 is stopped. For example, the paper lifting height sensor 43 comprises a pressure sensor and a processor, and when the pressure that the paper 6 in the paper lifting tray 41 applies to the pressure sensor achieves a predetermined pressure, the processor determines that the lifting height of the paper lifting tray 41 matches the predetermined height and then stops the power supplied from the power supply port 3.

In the embodiment as shown in FIG. 3, the motor 2 comprises a worm 201 which is corresponding to a worm wheel 421 comprised in the gear linking rod group 42, and the gear linking rod group 42 also comprises a pivoted arm 422 rotates the paper lifting tray 41 following the rotation of the worm 201 and the worm wheel 421. In particular, the kind of the paper lifting height sensor 43 and the mechanism designs of the motor 2 and the gear linking rod group 42 in the above embodiments are illustrative examples. In another embodiment, the paper lifting height sensor 43 can also comprise an infrared sensor other kind of sensor, and the mechanisms of the motor 2 and the gear linking rod group 42 can be designed by a person skilled in the art and are not limited in this disclosure.

In this embodiment, the breaking circuit 1 is disposed between the motor 2 and the power supply port 3 to be electrically connected between the two. As described in the previous embodiments of FIGS. 1A and 1B, the breaking circuit 1 comprises the actuator 11, the anti-reverse component 12 and the limiting resistor RL; the actuator 11 comprises the first electricity transmission terminal 111, the second electricity transmission terminal 112 and the controlled terminal 113, wherein the controlled terminal 113 is configured to be connected with the power supply port 3, and the first electricity transmission terminal 111 is configured to be electrically connected with the power input terminal 21 of the motor 2; the anti-reverse component 12 is electrically connected between the controlled terminal 113 of the actuator 11 and the first electricity transmission terminal 111, for obstructing the current from the power input terminal 21 of the motor 2 to the power supply port 3; and the limiting resistor RL is electrically and serially connected with the first electricity transmission terminal 111 or the second electricity transmission terminal 112 of the actuator 11, so as to form a discharge path P2 with the partial circuit of the actuator 11. As described previously, when the paper lifting height sensor 43 of the paper lifting device 5 determines that the lifting height of the paper lifting tray 41 matches the predetermined height, the power supplied from the power supply port 3 is stopped, and the motor 2 continues rotating due to inertia, so that the induced electromotive force is generated. At this moment, the breaking circuit 1 can provide a discharge path P2 for the induced electromotive force so as to quickly stop the motor 2 from rotating; thereby, the paper lifting tray 41 may accurately stop at the height sensed by the paper lifting height sensor 43, and effectively avoid the errors occurring in the business machine due to the abnormality of the paper feeding.

In view of the above structure, the breaking circuit in this disclosure can provide a discharge path formed by a limiting resistor and the partial circuit of an actuator for the connected motor. When the power supplied to the motor is stopped, the induced electromotive force generated by the rotation of motor due to inertia can be consumed by the discharge path, so that the motor may quickly stop rotating. For a paper lifting device having the above breaking circuit in this disclosure, when the paper lifting height matches the expectation, the operation of the breaking circuit may quickly stop the motor from rotating, so that the damages and the situation of paper jam caused by the interference between the paper lifting tray and other mechanisms in a business machine due to overlifting of the paper lifting tray may be avoided.

What is claimed is:

1. A breaking circuit, applied to a motor, and the breaking circuit comprising:
   an actuator, comprising a first electricity transmission terminal, a second electricity transmission terminal and a controlled terminal, with the controlled terminal configured to be connected with a power supply port, and the first electricity transmission terminal configured to directly be electrically connected with a power input terminal of the motor;
   an anti-reverse component, electrically connected between the controlled terminal and the first electricity transmission terminal of the actuator; and
   a limiting resistor, electrically and serially connected with the first electricity transmission terminal or the second electricity transmission terminal of the actuator;
   wherein when power supplied from the power supply port to the power input terminal is stopped, the actuator is conducted to form a discharge path from the power input terminal through the limiting resistor to a low electric potential end.

2. The breaking circuit according to claim 1, wherein the limiting resistor is electrically connected with the second electricity transmission terminal of the actuator, the actuator comprises a P-type transistor and a divider resistor, an electricity input terminal of the P-type transistor serves as the first electricity transmission terminal of the actuator, an electricity output terminal of the P-type transistor serves as the second electricity transmission terminal of the actuator, a sub controlled terminal of the P-type transistor is electrically connected with a first terminal of the divider resistor to jointly form the controlled terminal of the actuator, and a second terminal of the divider resistor is electrically connected to the low electric potential end.

3. The breaking circuit according to claim 2, wherein the P-type transistor comprises a bipolar junction transistor.

4. The breaking circuit according to claim 2, wherein the P-type transistor comprises a metal-oxide-semiconductor field-effect transistor.

5. The breaking circuit according to claim 4, wherein the actuator further comprises another divider resistor electrically connected between the electricity input terminal and the sub controlled terminal of the P-type transistor.

6. The breaking circuit according to claim 1, wherein the limiting resistor is electrically connected with the first electricity transmission terminal of the actuator, the actuator comprises a first N-type transistor, a second N-type transistor, a first divider resistor, a second divider resistor and a third divider resistor, a sub controlled terminal of the first N-type transistor is electrically connected with an electricity input terminal of the second N-type transistor and a first terminal of a first divider resistor, a sub controlled terminal of the second N-type transistor is electrically connected with a first terminal of the second divider resistor and a first terminal of the third divider resistor, a second terminal of the second divider resistor serves as the controlled terminal of the actuator, an electricity input terminal of the first N-type transistor serves as the first electricity transmission terminal of the actuator, an electricity output terminal of the first N-type transistor, an electricity output terminal of the second N-type transistor and a second terminal of the third divider resistor jointly serve as the second electricity transmission terminal of the actuator, and a second terminal of the first divider resistor is configured to be electrically connected with the power input terminal of the motor or another power supply port.

7. The breaking circuit according to claim 6, wherein the first N-type transistor comprises a bipolar junction transistor, and the second N-type transistor comprises a metal-oxide-semiconductor field-effect transistor.

8. The breaking circuit according to claim 6, wherein each of the first N-type transistor and the second N-type transistor comprises a metal-oxide-semiconductor field-effect transistor.

9. The breaking circuit according to claim 1, wherein the anti-reverse component comprises a diode, with an anode terminal of the diode electrically connected with the controlled terminal of the actuator, and a cathode of the diode electrically connected with the first electricity transmission terminal of the actuator.

10. A paper lifting device, comprising:
  a body, comprising a paper lifting tray, a gear linking rod group, a motor, a paper lifting height sensor and a power supply port, wherein the gear linking rod group is connected between the paper lifting tray and the motor, the power supply port is electrically connected between the motor and the paper lifting height sensor, the gear linking rod group is rotated by the motor to bring the paper lifting tray to rotate when the power supply port supplies power to the motor, and the power supply port stops supplying the power when the paper lifting height sensor determines that a lifting height of the paper lifting tray matches a predetermined height; and
  a breaking circuit, electrically connected between the motor and the power supply port, comprising:
  an actuator, comprising a controlled terminal, a first electricity transmission terminal and a second electricity transmission terminal, with the controlled terminal configured to be connected with the power supply port, and the first electricity transmission terminal directly electrically connected with a power input terminal of the motor;
  an anti-reverse component, electrically connected between the controlled terminal and the first electricity transmission terminal of the actuator; and
  a limiting resistor, electrically and serially connected with the first electricity transmission terminal or the second electricity transmission terminal of the actuator;
  wherein when the power supply port stops supplying the power, the actuator is conducted to form a discharge path from the power input terminal through the limiting resistor to a low electric potential end.

* * * * *